United States Patent [19]
Hart, Jr. et al.

[11] Patent Number: 6,154,843
[45] Date of Patent: *Nov. 28, 2000

[54] SECURE REMOTE ACCESS COMPUTING SYSTEM

[75] Inventors: Edward C. Hart, Jr., Redmond; Casey Lang Kiernan, Kirkland; Vij Rajarajan, Issaquah, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,303

[22] Filed: Mar. 21, 1997

[51] Int. Cl.[7] .............................. G06F 11/30; H04L 9/00
[52] U.S. Cl. ......................... 713/201; 713/200; 713/202
[58] Field of Search ............................ 395/187.01, 186, 395/188.01, 200.47, 200.49, 200.59; 380/4, 23, 25, 21, 30, 44; 340/825.31, 825.32; 713/200, 201, 202

[56] References Cited

U.S. PATENT DOCUMENTS

| | | | |
|---|---|---|---|
| 5,515,508 | 5/1996 | Pettus et al. | 395/200.01 |
| 5,550,984 | 8/1996 | Gelb | 395/200.17 |
| 5,577,209 | 11/1996 | Boyle et al. | 395/200.06 |
| 5,642,515 | 6/1997 | Jones et al. | 395/727 |
| 5,649,190 | 7/1997 | Sharif-Askary et al. | 395/612 |
| 5,715,823 | 2/1998 | Wood et al. | 928/660.01 |
| 5,797,015 | 8/1998 | Daniels, Jr. et al. | 395/712 |
| 5,864,683 | 1/1999 | Boebert et al. | 395/200.79 |
| 5,889,863 | 3/1999 | Weber | 380/25 |

*Primary Examiner*—Dieu-Minh T. Le
*Attorney, Agent, or Firm*—Woodcock Washburn Kurtz Mackiewicz & Norris LLP

[57] ABSTRACT

A secure remote access computing system for executing tasks on a secure private network requested by an unsecured remote computing device connected to the secure private network by way of a public communication network, without exposing any device in the secure private network other than a designated network interface device to the public communication network. The network interface device dynamically generates a custom program containing the necessary network data and user interfaces and verifies the security privileges for the remote computing device, so that a remote user can define the task being executed on the private network by way of the secure network interface device surrogate. The unsecured remote computing device and the secure network interface device communicate by accepted conventions of protocols and commands that are well known and used by other users of the public communication network.

36 Claims, 2 Drawing Sheets

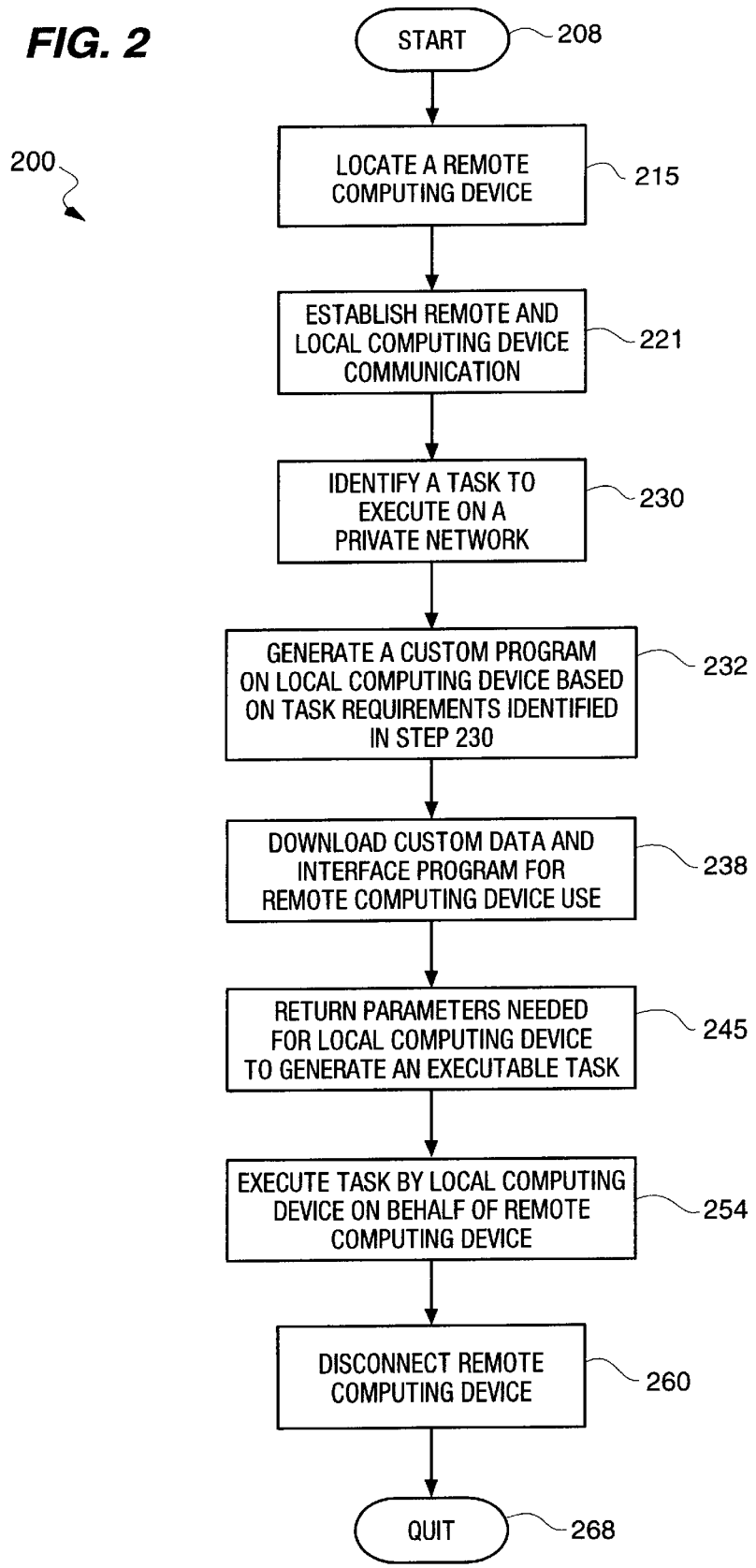

SECURE REMOTE ACCESS COMPUTING SYSTEM

FIELD OF THE INVENTION

This invention relates to the field of secure remote access computing and in particular to a system for supporting secure remote access computing from an unsecured computing device to a secure computing device by way of a public communication network.

PROBLEM

A variety of techniques have been used throughout the history of computing to establish secure access to computing resources on a local computing device from a remote computing device. One technique often used by government facilities and private research facilities is to require the physical presence of a user that intends to use a secure computing device. Requiring the physical presence of a user facilitates a highly secure computing environment and restricting physical access to a computer is relatively easy. However, requiring a user's physical proximity to a computing device severely limits the options for a system administrators, for example, who must provide 24 hour-a-day support for a secure computing device. Even if an off-site administrator has the knowledge and/or authority to deal with a situation on the a given computing device, the situation can not be immediately addressed without remote access. Although the lack of remote access is only an inconvenience if the off-site administrator is only tens of minutes from the secure computing device, the lack of remote access is significant if the off-site user is tens of hours or days away from the computing device and communicating passwords and/or other instructions by a telephone conversation with a local user is a security breach.

One alternative technique for establishing secure remote access to computing equipment in a computing facility is to allow remote access from a remote computing device to a local computing device by way of a private communication medium. The private communication medium might be, for example, a dedicated "hard wired" communication link or a MODulator DEModulator (MODEM) "dial-up" communication link on the private communication medium. One advantage to secure remote access by way of a private communication link is that the local computing device and the remote computing device can remain under exclusive physical control along with the private communication medium therebetween. However, even this type of secure remote access environment can be a significant problem if the remote computing device is not readily available to the off-site user at the off-site user's present location.

Another alternative technique for establishing secure remote access from a remote computing device to a local computing device is to establish remote access by way of an encrypted and/or password protected MODEM dial-up connection over a public communication medium. One advantage of this type of remote access is that the off-site user can establish access to a local computing device from any remote location that offers MODEM access to the public communication medium. Although password protection and/or encryption techniques are widely known and used in the industry, the remote computing device being used must support the type of encryption technique being used by the local computing device. Another disadvantage is that special terminal emulations and/or hardware specific requirements often exist that can preclude the use of simply any remote computing device. Thus, even the added flexibility of using a public communication medium can be severely limited without a remote computing device that meets some minimum of support for specific hardware and/or software requirements.

Another disadvantage of remote access by way of a MODEM dial-up connection over a public communication medium is that any user having a computing device, a MODEM, and access to the public communication medium, can attempt to access the local computing device without permission. Many unauthorized users that have broken into a local computing device have demonstrated that once a user has gained access to or is "into" the local computing device, the unauthorized user may have unrestricted access to many files and even other computing devices in a local network, often leading to destructive or at least disruptive results.

The problem with the above mentioned techniques is that they each have unique requirements that either severely restrict remote access to local computing devices or severely limit the type and/or configuration of remote computing devices that might otherwise be used to remotely access a local computing device or computing facility. For these reasons, there exists an ongoing need for a system that supports secure remote access to a local computing device or facility from anywhere in the world while requiring only a minimum of remote computing device features. Such a system has heretofore not been known prior to the invention as disclosed and claimed below.

SOLUTION

The present invention solves the above stated problems by supplying the necessary computer program intelligence, user interface features, and security measures for a remote computing device to communicate with a secure local computing device over a public communication network connection. The invention allows any unsecured remote computing device to define and execute a task on a local device in a private network by way of a secure network interface device. The secure network interface device is the secure gateway to the private network. The remote computing device and the secure network interface device need only communicate by standard protocols and instructions that are well known and used by users of the public communication network. The remote computing device can be any ordinary unsecure device such as a personal computer that has modem access to the public communication network.

The security of the system results first from password protected access to the secure network interface device and second from a customized real-time program generated by the secure network interface device for execution on the remote computing device. The customized program supplies the remote user with a user interface in which to formulate the desired task and only enough information about the local target computing device or private network for the remote user to formulate the requested task. The remote user is only allowed to formulate a specific task or tasks and the task must be one that the remote user would be authorized to execute if the user were local to the target computing device or private network. For added security, the secure network interface device is the only device that is allowed to execute the requested task on behalf of the remote user. The remote user is never logged into any computing device other than the remote computing device, and the remote user never has direct contact with the target computing device or private network on which the requested task is operating.

Operationally, the remote user of the remote computing device establishes an operable communication link between the remote computing device and the secure network interface device by way of the public communication network. The remote user identifies a task that the remote user wishes to execute on at least one device in the private network. The desired task is communicated to the secure network interface device along with any necessary authorization and/or permissions. The secure network interface device verifies that the remote user has permission to execute such a task or tasks on the desired device of the private network. The secure network interface device dynamically generates a custom program for the remote user to execute to define the parameters necessary to construct an executable task. The defined parameters are communicated back to the secure network interface device where the task is executed by the secure network interface device on behalf of the remote user. The remote user is never allowed direct contact with the target computing device on which the requested task is executed.

In the preferred embodiment, the public communication network is the Internet, also known as the World Wide Web. The remote computing device and secure network interface device communicate over the Internet by way of customized Web pages. The remote user connects to the private network's Internet site on the secure network interface device as identified by the Universal Resource Locator (URL) protocol. The remote user's task preferences are revealed to the secure network interface device and the remote users security privileges are checked to determine what tasks the remote user is allowed to perform on what devices in the private network. If the remote user has the necessary security privileges then the secure network interface device dynamically generates a customized Web page that supplies the remote user with a set of customized program code that includes but is not limited to a Web page user interface any network specific information that is needed for the remote computing device's Web browser to function as a local device would within the private network. The remote user defines the specific activity that is to take place by executing the specified task and the specific activity and any associate parameters are communicated back to the secure network interface device where the task is executed on a target computing device or devices in the private network. The secure network interface device executes the specified task on the private network by way of a secure link to the private network without exposing any device in the private network to the remote user specifically or the open Internet generally.

BRIEF DESCRIPTION OF THE DRAWINGS

FIG. 2 illustrates an overview of the secure remote access computing system operational steps in flow diagram form.

DETAILED DESCRIPTION

System Configuration—FIG. 1

Figure 1:
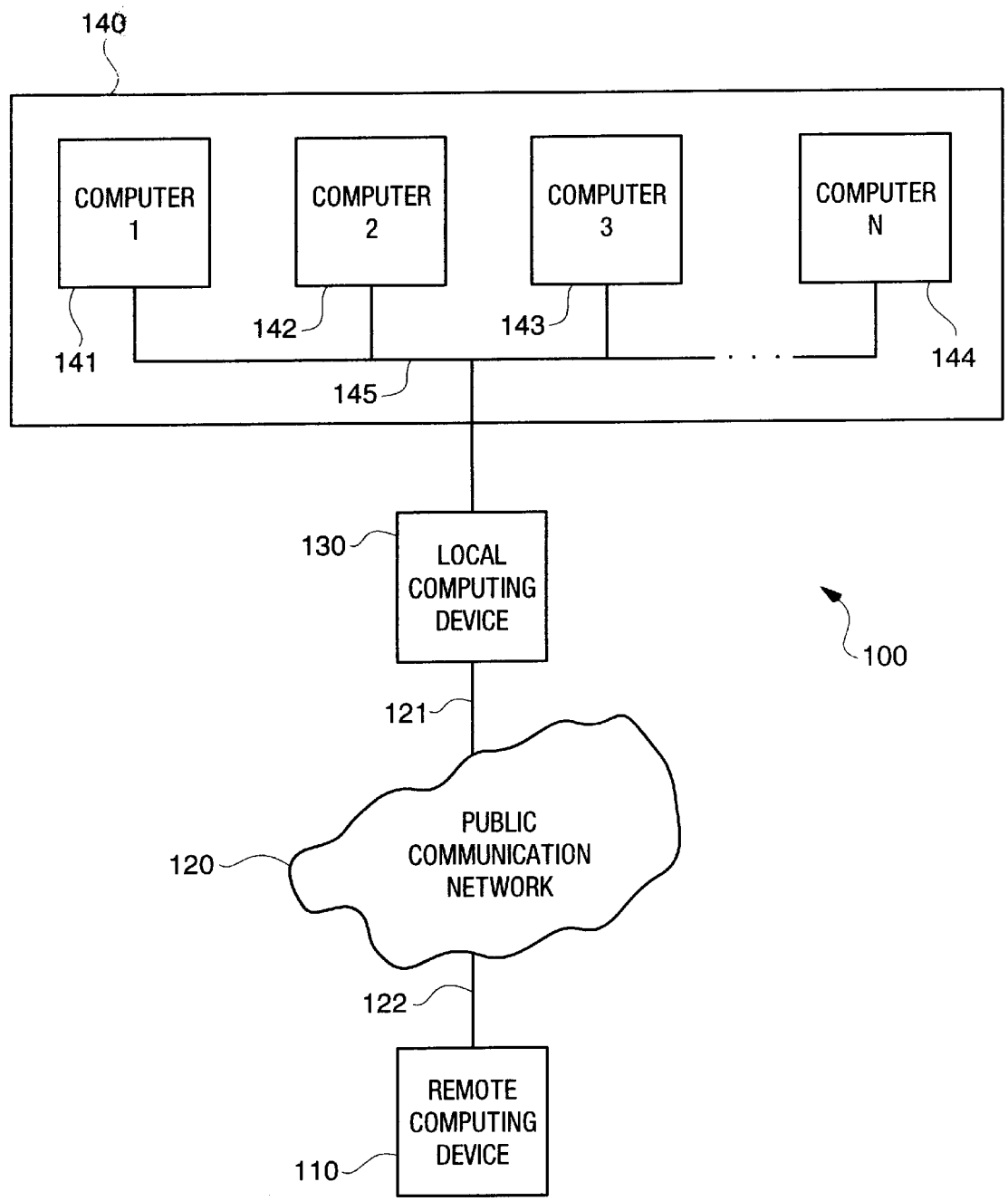
FIG. 1 illustrates a secure remote access computing system configuration in block diagram form.

FIG. 1 illustrates a block diagram example of a system configuration 100 for the secure remote access computing system of the present invention. The computing device configuration 100 illustrated in FIG. 1 includes, but is not limited to, a remote computing device 110, a public communication network 120, a local computing device 130, and a target computing device or private network 140.

Remote computing device 110 can be any computing device that supports computing essentials including, but not limited to, a processing complex, a memory, a human readable output device, and a human user controlled input device. A human readable output device typically includes an electronic display device, and a human user controlled input device typically includes a standard keyboard and/or a screen display pointer device often known as a mouse. One additional and essential feature of the remote computing device 110 is that it is configured with whatever minimum requirement of software and/or hardware that is necessary to access another computing device by way of the public communication network 120. Examples of commonly available computing devices that can fill the role of remote computing device 110 include, but are not limited to, a personal computer, a workstation, a multi-user computer, and a network computer. Remote computing device 110 is operatively connected to public communication network 120 by remote communication link 122 that can be either a wire or wireless connection by any means well known and widely used in the communication industry.

Public communication network 120 is any bidirectional network accessible to the general public from computing devices such as remote computing device 110 that is a device widely available to the general consumer public. Connectivity to public communication network 120 is available by way of private server nodes often supported by private corporations, public and private educational institutions, not-for-profit organizations, government installations, or commercial for-profit service providers that are all well known and available in the industry. In one preferred embodiment, the public communication network 120 is commonly referred to as the Internet, also known or loosely referred to as the Net, the Information Super Highway, the World Wide Web, and the Web. The Internet for purposes of the present disclosure, is not to be confused with electronic mail, bulletin boards, or USENET news or discussion groups that often accompany but are not part of and are beyond the scope of the present invention.

The Internet, or the portion thereof that is relevant to the preferred embodiment of the present invention, is the network of computing devices or nodes, whether individually hardware and/or software compatible or not, that communicate or otherwise interact with each other by some combination of protocols and languages. Common Internet protocols and languages include but are not limited to, the Transmission Control Protocol/Internet Protocol (TCP/IP), the Telnet command and terminal emulator protocol, the HyperText Transfer Protocol (HTTP), the HyperText Markup Language (HTML) programming language of the Internet, and the Uniform Resource Locator (URL) protocol for identifying documents on the Internet. A URL document may also be loosely referred to by names including, but not limited to, Web page, Home page, Web site, Internet site, Web address, Location, and Link.

The generic software that is necessary for remote computing device 110 to access documents from the Internet is commonly referred to as a browser or Web browser. A Web browser converts raw HTML coding into a graphical display on a computing device for viewing by a human user. A multitude of commercial Web browsers are readily available in the industry for virtually every computing device designed and/or made publicly available after or about January 1992.

Local computing device 130, also known as an Internet Interface Device (IID) when acting as a private network 140 gateway, has at least the same and typically more computing features and/or capabilities than the remote computing device 110. In addition to the capabilities of remote computing device 110, local computing device 130 supports a publicly accessible Web site having a URL address in the preferred embodiment. The local computing device 130 is operatively connected to public communication network 120 by local communication link 121. Local communication link 121 can be either a wire or wireless connection supported by any of several techniques that are well known and widely used in the communication industry.

Local computing device 130 can be an endpoint target itself and/or it can be operatively connected to private network 140, as in the preferred embodiment, by way of a private network link 145. When connected to a private network, the local computing device 130 is the secure network interface device that acts as a fire wall or gate keeper to control remote access to the private network 140. Local computing device 130 is also the only outside computing device that is allowed to communicate with computing devices within the private network 140 on behalf of any remote computing device including remote computing device 110. Alternatively, local computing device 130 may be considered the only target device with which remote computing device 110 wishes to communicate.

Private network 140 can be any configuration of one or more computing devices having any type of connectivity. In the preferred embodiment, private network 140 is an intranetwork of N computing devices 141–144 interconnected by a Local Area Network (LAN) 145.

Operational Steps—FIG. 2

FIG. 2 illustrates an overview of the secure remote access computing system operational steps 200 in flow diagram form. The operational steps 200 begin at step 208 and proceed to step 215. At step 215 a user that is remote from private network 140 locates a designated local computing device 110 that is capable of communicating with a remote computing device 130 by way of public communication network 120. In the preferred embodiment, the first local computing device 110 is a personal computer or network computer that is configured with a Web browser, a MODEM or other communication device suitable for communicating on remote communication link 122, and sufficient memory and computing power to interact with another computing device over the Internet 120. The advantage of communicating over the Internet 120 is that Web browser equipped computing devices are increasingly prevalent in the business community and in private homes. The result of this proliferation of Web browser equipped computing devices is that a suitable remote computing device 110 can be easily located anywhere in the world.

Having located a suitable remote computing device 110, the remote user establishes communications from the remote computing device 110 to the local computing device 130 at step 221 by way of public communication network 120. In the preferred embodiment, the communication is established by dialing or otherwise contacting an Internet Service Provider (ISP) or other private Internet service connection source that can provide connectivity to the Internet. Once Internet access is established, a request to communicate with the local computing device 130 is made by entering a URL command communicated with the HTTP protocol. A typical URL uses syntax such as "http://www.microsoft.com" for example.

At step 230, the remote user that has established communication from the remote computing device 110 to the local computing device 130, can specify or otherwise request the type of processing capability that is desired to accomplish a particular task on the private network 140 from remote computing device 110. In the preferred embodiment for example, if a network administrator for private network 140 were out of the country when the need for performing a network administration task arose, the network administrator would request from local computing device 110 the processing capability needed to perform a specific administration task. The remote user would make an administrator type request by entering a description of the specific task or by selecting from a Web page supported list of specific tasks that the network administrator is authorized to perform if the network administrator were present at the local computing device 130. Determining the level of the administrator's authorization is accomplished by password protection and/ or other similar security authorization code uniquely known only to that individual remote user.

At step 232, the local computing device 130 generates a custom network page that includes custom programs unique to the task requested by the remote user in response to the command request made in step 230. The customized program may include, but is not limited to, data specific to the private network 140, a custom user interface specific to the type of command access requested, and custom program code specifically designed to support information gathering from the remote user and to support executing the requested command or commands on the private network 140 by way of local computing device 130. In the preferred embodiment, the custom programs include a customized Web page that is HTML compatible and that contains custom Web page type interface support and network specific data necessary to supply the remote network administrator with the interface tools and network specific information that are unique to the private network 140. Further, the custom Web page and custom programs are expressly limited to the scope of the requested task that the remote user is authorized to perform. The data specific to the private network 140 may include network configuration details, network administration parameters, and/or machine or node specific information such as passwords or network address information.

At step 238, the local computing device 130 downloads the customized programs of step 232 using standard public communication network 120 protocols and standard network browser programming language code, to the remote computing device 110. The downloaded programs give the remote user the ability to "perform" the desired task by running the downloaded program on the remote computing device 110 host. In the preferred embodiment, the remote user has the same level of access authorization and control over private network 140 as if the remote user were actually sitting in front of and logged onto local computing device 130. The customized Web page of step 232 is delivered to the remote computing device 110 Web browser using standard Internet protocols and HTML programming language code. Thus, the remote computing device 110 that had minimal capability and was previously ignorant of any specific private network details now has all the capability needed to complete the specific task requested by the remote user to the same extent as if the network administrator were entering the commands on local computing device 130 or any other computing device within private network 140.

At step 245, the remote user transmits the instructions, commands, parameters, and/or other information that is necessary for the local computing device 130 to execute the task requested by the remote user. If all authorizations and permissions remain satisfactory at step 254, the local computing device 130 executes the completed command or task on behalf of the remote user. Key to this surrogate relationship is that sensitive tasks, programs, and/or commands are executed by way of a local computing device 130 and its secure communication link 145 to private network 140. Remote computing device 110 never has direct contact with private network 140 and is never logged into the local computing device 130 or any computing device within private network 140. In the preferred embodiment, local computing device 130 acts as a secure Internet Interface Device (IID) that protects each node in private network 140 from direct contact with the open Internet where unauthorized users or pirates might otherwise gain access and damage parts or all of the private network 140.

At step 260, if all processing needs of the remote user have been satisfied, the remote user disconnects the remote computing device 110 from the public communication network 120. Processing stops at step 268.

SUMMARY

The secure remote access computing system supports the necessary intelligence and security measures so that a remote computing device can communicate with a local computing device over a public communication network. The remote computing device is used to define and request execution of a task or tasks on a device in a private network by way of a secure network interface device surrogate. The remote computing device communicates using standard public communication protocols and is never logged into any local computing device and never has direct contact with a target computing device in a private network. The private network is never exposed to the public communication network. Although specific embodiments are disclosed herein, it is expected that persons skilled in the art can and will make, use, and/or sell alternative secure remote access computing systems that are within the scope of the following claims either literally or under the Doctrine of Equivalents.

What is claimed is:

1. At least one computer readable medium containing computer executable instructions to perform a method comprising:

establishing a communication link between a first computing device and a second computing device by way of a public communication network;

communicating, from said first computing device to said second computing device, a request by a user of said first computing device to execute a task controlled by said second computing device;

verifying on said second computing device that said user of said first computing device is authorized to execute said task;

dynamically generating a customized program on said second computing device that contains data and user interface features necessary for said user of said first computing device to define at least one parameter required to execute said task;

transmitting said customized program from said second computing device to said first computing device;

executing said customized program on said first computing device for said user to define said at least one parameter required to execute said task;

transmitting said at least one parameter required to execute said task from said first computing device to said second computing device; and executing said task by said second computing device on behalf of said first computing device.

2. A method according to claim 1 wherein said step of establishing includes:

transmitting a Universal Resource Locator style command from said first computing device that uniquely identifies said second computing device using a Hyper Text Transfer Protocol style communication protocol over said public communication network without said user of said first computing device having log-on access to said second computing device; and responding from said second computing device to said first computing device to confirm that operable communications exist between said first computing device and said second computing device.

3. A method according to claim 1 wherein said task is an administration type task directed toward at least one computing device selected from a group comprising: said second computing device and at least one node of a private network that is operatively connected to said second computing device as a gateway to said private network.

4. A method according to claim 1 wherein said task is any computing operation operable on at least one target computing device selected from a group comprising: said second computing device and at least one node of a private network that is operatively connected to said second computing device as a gateway to said private network.

5. A method according to claim 1 wherein said step of dynamically generating includes:

identifying a minimum set of data and user interface features necessary for said user of said first computing device to define an executable one of said task; and generating a custom Web page available only to said user of said first computing device that contains said minimum set of data and user interface features.

6. A computer-readable storage device containing instructions for controlling a computer system to perform steps according to claim 1.

7. A method comprising:

establishing a communication link between a remote computing device and a secure network interface to a private network by way of a public communication network;

communicating, from said remote computing device to said secure network interface, a request by a user of said remote computing device to execute a network administration task on at least one node of said private network;

executing, in response to said request, said task by said secure network interface on behalf of said at least one node of said private network without said user of said remote computing device having direct log-on access to any of said at least one node of said private network;

generating, in response to said request to execute said task, a custom program on said secure network interface that contains data and user interface features unique to said task;

verifying that said user of said remote computing device is authorized to execute said task;

downloading said custom program from said secure network interface to said remote computing device;

executing said custom program on said remote computing device for said user to define said at least one parameter necessary to execute said task; and transmitting said at least one parameter necessary to execute said task from said remote computing device to said secure network interface.

8. A computer-readable storage device containing instructions for controlling a computer system to perform steps according to claim 7.

9. The method of claim 7, wherein the generated custom program contains data specific to the private network.

10. The method of claim 9, wherein the data specific to the private network includes network configuration details, network administration parameters, network address information, passwords, or node specific information.

11. A secure remote access network administration system using a public communication network comprising:

a remote computing device having a network browsing program and access to said public communication network;

a private network having a plurality of computing devices therein;

a network interface device supporting service for a publicly accessible Web page, said network interface device also having access to said public communication network and supporting a private communication link to said private network;

means for establishing a communication link between said remote computing device and said network interface device;

means for communicating, from said remote computing device to said network interface device, a request by a user of said remote computing device to execute an administrative task on at least one of said plurality of computing devices in said private network;

means for verifying on said network interface device that said user of said remote computing device is authorized to execute said administrative task;

means for dynamically generating a custom Web page on said network interface device that is unique to said administrative task and contains only enough data and user interface features as are required for said user of said remote computing device to define at least one parameter necessary to construct an executable one of said administrative task;

means for transmitting said custom Web page from said network interface device to said remote computing device;

means for executing said custom Web page on said remote computing device for said user to define said at least one parameter necessary to construct an executable one of said administrative task;

means for transmitting said at least one parameter from said remote computing device to said network interface device; and means for executing said administrative task, in response to said request, by said network interface device on behalf of said at least one of said plurality of computing devices in said private network without said user of said remote computing device being logged onto said network interface device as a network interface device user and without having direct access to any one of said plurality of computing devices in said private network.

12. A system according to claim 11 wherein said means for establishing includes:

means for locating a remote computing device with operable access to said public communication network;

means for communicating on said public communication network by way of an accepted communication protocol standards; and means for locating said network interface device by way of a Universal Resource Locator style command that uniquely identifies said network interface device using a Hyper Text Transfer Protocol style communication protocol.

13. A system according to claim 12 wherein said means for dynamically generating includes:

means for determining a minimum set of private network data that is required to perform said administrative task;

means for extracting said minimum set of private network data from said private network; and means for generating a custom user interface program based on said minimum set of private network data and at least one informational parameter prompt for completion by said user of said remote computing device.

14. A system according to claim 13 including:

means for shielding said plurality of computing devices in said private network from direct access from said remote device over said public communication network.

15. A method for executing a task on a secure local computing device on behalf of at least one of a plurality of secure computing devices in a private network, in response to a request to execute said task that is communicated over a public communication network to said secure local computing device by an unsecured remote computing device, said method comprising:

verifying, on said secure local computing device in response to said request, a permission for a user of said unsecured remote computing device to request execution of said task;

dynamically generating, on said secure local computing device, a custom user interface in a custom program unique to specific variables needed to execute only said task;

executing said custom user interface in said custom program on said unsecured remote computing device to define parameters needed to execute said task;

communicating said parameters from said unsecured remote computing device to said secure local computing device for execution on said secure local computing device; and executing said task on said secure local computing device.

16. A method according to claim 15 wherein said step of dynamically generating includes:

determining a minimum set of private network data that is relevant to said task and needed by said user to define said parameters unique to said task;

extracting said minimum set of private network data from said private network;

integrating said minimum set of private network data into said custom user interface in said custom program to prompt said user for only said parameters needed to generate an executable one of said task; and generating an executable one of said task from said parameters supplied by said user.

17. A computer-readable medium having computer-executable instructions stored thereon, said computer-executable instructions performing steps comprising:

receiving at least one first message from a remote computer over a public communications system identifying a user process of the remote computer;

authorizing the user process in response to the first message;

transmitting at least one second message to the remote computer over the public communications system to identify devices in a private network and network administration tasks for execution on the identified devices;

receiving at least one third message from the remote computer over a public communications system indicating selected network administration tasks and selected devices from the identified tasks and devices;

generating selected information comprising network administration tasks capable of being performed and selected devices information for the user process;

transmitting at least one fourth message containing at least part of the generated selected information to the user process over the public communications system;

receiving at least one fifth message from the user process over a public communications system including at least one parameter for performing one of the selected tasks on one of the selected devices; and initiating the performance of one of the selected tasks on one of the selected devices.

18. The method of claim 17, wherein the at least one second message includes private network configuration details, network administration parameters, network address information, passwords, or node specific information.

19. A method for accessing a private network by way of a public network, comprising:

providing a secure network interface device as a connection between a private network and a public network;

receiving a request from a user of a first computing device at said secure network interface device for the capability to perform a computing task on said private network by way of said public network;

dynamically generating and transmitting a program from the secure network interface device to the first computing device, said program providing the user with the capability to perform the requested computing task, said program having data and a user interface feature necessary for said user to define at least one parameter and limiting the requestor's capability to perform computing tasks not authorized by the program;

receiving a second request comprising said at least one parameter at the secure network interface from the requestor by way of the program to perform the computing task on the private network; and initiating the performance of the computing task on the private network by way of the secure network interface device.

20. The method as recited in claim 19 wherein the public network comprises the Internet.

21. The method as recited in claim 19 wherein the private network comprises a local area network.

22. The method as recited in claim 21 wherein said computing task comprises a task performable by an administrative level user.

23. The method as recited in claim 19 wherein the program transmitted comprises a web page.

24. A computer readable medium bearing computer readable instructions, said instructions being capable of carrying out the steps recited in claim 19.

25. A system for providing secure access to a private network, comprising:

a private network of computing devices;

a secure network interface device coupled between said private network and a public network; and a network interface computing operation disposed on said secure network for controlling access to the private network of computing devices, said network interface computing operation comprising computer executable instructions for: providing a set of authorized computing tasks that can be performed on the private network by way of the secure network interface; receiving a request from a user of a first computing device over a public network, said request requesting the performance of a specified one of the authorized computing tasks; dynamically generating and transmitting a program to a requestor of the performance of the specified one of the authorized computing tasks wherein said program provides data and user interface features necessary for the user of said first computing device to define at least one parameter that can be specified in performance of said task; and performing said task after receiving the specified at least one parameter from the program.

26. The system as recited in claim 25 wherein the public network comprises the Internet.

27. The system as recited in claim 25 wherein the private network comprises a local area network.

28. The system as recited in claim 25 wherein the program transmitted comprises a web page.

29. The system as recited in claim 25 wherein said computing task comprises a task performable by an administrative level user.

30. The system as recited in claim 25 wherein the set of authorized computing tasks is determined by the requestor's authorization level.

31. A method for use on a secure network interface device for providing accessing to a private network via a connection to a public network, comprising:

providing a set of specific authorized tasks capable of being performed on said private network by way of said public network;

receiving a request from a user of a first computing device over the public network, said request requesting the performance of one of said specific authorized tasks;

dynamically generating and transmitting a program to the first computing device, said program providing data and a user interface feature necessary for said to user to specify at least one parameter in performing said one of specific authorized tasks;

receiving said at least one parameter; and performing said one of said specific authorized tasks on said private network.

32. The method as recited in claim 31 wherein the public network comprises the Internet.

33. The method as recited in claim 31 wherein the private network comprises a local area network.

34. The method as recited in claim 31 wherein the program transmitted comprises a web page.

35. The method as recited in claim 31 wherein said specific authorized tasks comprise tasks performable by an administrative level user.

36. The method as recited in claim 31 wherein the set of specific authorized tasks is based upon the authorization level of the requestor.

\* \* \* \* \*